June 29, 1965 R. W. ZEIGLER ETAL 3,191,906
FLOW CONTROL VALVE WITH A V-SHAPED OPENING
Filed June 18, 1962
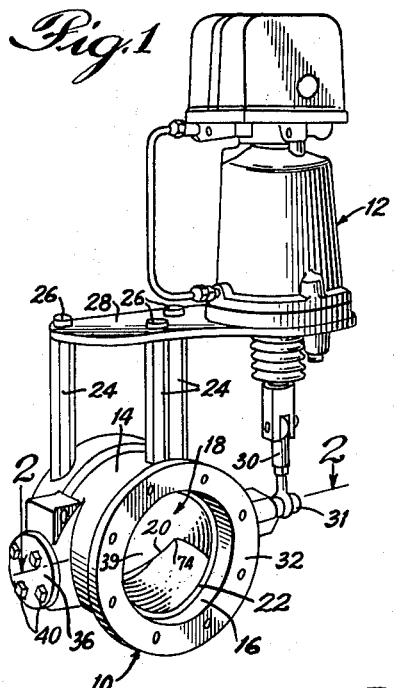
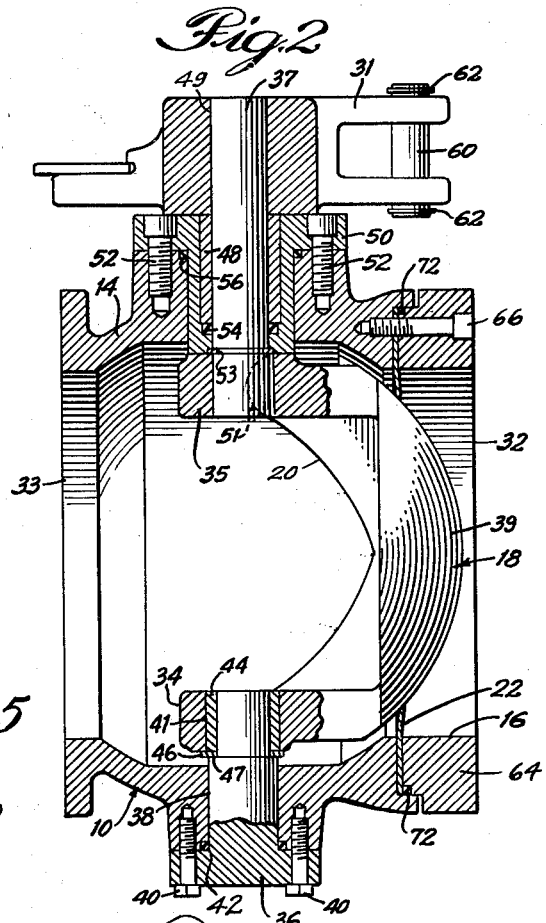
INVENTORS:
Ralph W. Zeigler
and Hubert J. Grabenbauer,
BY Bair, Freeman & Molinare
ATTORNEYS.

3,191,906
FLOW CONTROL VALVE WITH A
V-SHAPED OPENING
Ralph W. Zeigler and Hubert J. Grabenbauer, Marshalltown, Iowa, assignors to Fisher Governor Company, Marshalltown, Iowa, a corporation of Iowa
Filed June 18, 1962, Ser. No. 203,188
5 Claims. (Cl. 251—208)

This invention relates to a flow control valve and, more particularly, to a flow control valve for use with fluids containing solids or for use with semi-solid masses.

Heretofore, difficulty has been encountered in utilizing conventional valves to control the flow of fluids that are semi-solid in nature or fluids which contain solids or particles therein. An example of one such fluid is pulp and paper stock. Butterfly valves have been used but are not suited for this type of service because the solids tend to be caught in the small, half-moon shaped openings found at either side of the butterfly valve between the valve and the interior of the valve casing. The slit-like shape of the opening causes solids to be caught even when the area of the opening is reasonably large. Further, because of the paddle-like action of the butterfly valve, there is a large force requirement for movement of the buterfly valve in a semi-solid mass.

The sliding gate valve is not satisfactory for this type of service as it is costly to manufacture and the valve actuator must have a very long stroke on large valves. Further, tight closure of the gate valve against the seat is difficult to obtain.

Conventional rising stem, globe and angle valves are unsuitable for service with semi-solid masses because of the irregular flow channel through these valves.

The conventional ball valve is not well suited to service with fluids containing solids for when the valve is closed, such solids tend to solidify because of the shape of the opening within and through the valve plug. Normally, the opening is cylindrical and when the valve plug is in a closed or nearly closed position, the inner cavity of the valve plug may act as a cylindrical mold. If the fluid in the valve tends to solidify, it forms a mass which sticks in the bore of the valve plug and prevents increased flow of fluid through the valve on increased valve opening.

Another type of valve that has been used with semi-solid masses is the type that employs a resilient cylindrical tube which is flattened by mechanical or fluid pressure to close it. This type of valve tends to compress a semi-solid mass on closing and thus it tends to clog. Also, the flow of fluids through this type of valve causes the tube to flutter or pulsate causing undesirable noise and wear. Thus, it is seen that many problems have been encountered in utilizing conventional valve structures to control the flow of fluids containing solids and semi-solid fluid masses.

It is with these problems in mind, that the present flow control means has been evolved for controlling the flow of fluids which contain solids or fluid masses which are almost semi-solid. The valve means of the present invention tends to resist clogging, shuts off more tightly, and throttles more satisfactorily than known constructions, while at the same time the proposed valve means is more compact and uses a minimum quantity of material in construction thereof.

An object of the present invention is to provide a novel flow control valve wherein the disadvantages and deficiences of prior constructions are obviated.

Another object of the present invention is to provide a flow control valve for use with fluids containing solids or with semi-solid masses, such valves being capable of shutting off the flow of such material tightly, and the design of such valve utilizing a minimum of materials.

A further object of the present invention is to provide a flow control valve having therein a valve plug formed with a unique V-shaped opening which permits particles or chunks of solid matter in the fluid to pass through the valve opening during all flow conditions.

Still another object of the present invention is to provide a flow control valve with a novel valve plug having a V-shaped opening therein, the leading edges of the V-shaped opening cooperating with a sealing ring in the control valve with a scissors action, thus, tending to wipe the seating surface and cut any particles that would prevent tight valve seating.

Other objects of the invention will be obvious from the foregoing description of a preferred embodiment of the invention.

This invention relates to a flow control valve comprising, in combination, a casing having an inlet, an outlet and a flow passage therethrough, a valve plug for selectively closing said flow passage, means mounting said valve plug in said casing, means for actuating said valve plug, and seal means engaging the valve plug to substantially prevent leakage between the interior of the casing and the surface of the valve plug, the valve plug having a generally spherical outer surface and having an opening therethrough extending toward the center of the valve plug from the surface thereof, thereby providing a flow path through the valve plug, whereby the valve plug can be moved by the actuating means from a position closing the flow passage to a position wherein the opening is at least partially alined with the flow passage, thus permitting flow through the valve plug.

The novel structural components and their mode of functioning will be made most manifest and particularly pointed out in clear, concise and exact terms in conjunction with the accompanying drawings, wherein:

FIGURE 1 is a perspective view of a flow control valve of the present invention and an actuator therefor;

FIGURE 2 is a cross-sectional view of the flow control valve taken generally on the line 2—2 of FIGURE 1;

FIGURE 3 is a perspective view of the valve plug and the actuator stem therefor;

FIGURE 4 is a front view of the valve plug illustrating in dotted line successive shapes of the opening through the valve as the valve plug moves from the closed position to the open position; and FIGURE 5 is a front view of the flow control valve of FIGURE 1.

Referring now to FIGURE 1, there is illustrated a flow control valve assembly comprising a flow control valve designated generally at 10 and an actuator designated generally at 12. The flow control valve 10 comprises a casing 14 having therethrough a flow passage 16.

Disposed within the flow passage 16 is a valve plug 18 having a novel, generally V-shaped opening 20 therein. Seal means 22 are provided to prevent the leakage of material between the valve plug 18 and the interior of the casing 14. It is seen that the inner periphery of the seal means abuts the outer surface of valve plug 18.

Suitable supports 24 are affixed to the valve casing 14, for example, screwing the supports into raised bosses on the valve casing. Mounted on the top of the supports 24 is a base 28, which base is affixed to the supports 24 by fastening means, preferably bolts or machine screws 26. The actuator 12 is connected to the base 28. Such actuator may be the type 480 pneumatically operated piston actuator manufactured by the Fisher Governor Company, Marshalltown, Iowa. As will be apparent, other actuators can be utilized.

Extending from the actuator is an actuating rod 30. The lower end of the actuating rod 30 is connected to a clevis 31. The clevis 31, in turn, is suitably connected to the valve plug 18 for actuating the same about a horizontal axis, as will be made more clear hereinafter.

Turning now to FIGURE 2, there is illustrated a cross-sectional view taken through the casing 14 of the control valve of FIGURE 1 generally along the line 2—2. The casing 14 has an inlet 32 adapted to be connected to a supply pipe conducting fluid to the valve and an outlet 33 adapted to be connected to a pipe conducting fluid from the valve. As aforenoted, it is intended that the present control valve be utilized for fluids which contain solid materials or for semi-solid fluid masses.

The valve plug 18, which is preferably chrome plated, comprises journal members 34 and 35 and a generally hemispherical portion 39. The means for rotatably supporting the valve plug 18 within the casing 14 comprise journal plug 36 and actuating stem 37. The journal plug 36 extends through an opening 38 in the casing into an opening 41 in the journal member 34. Bolts or machine screws 40 secure the journal plug 36 to the casing 14. An O-ring 42 may be provided between the journal plug and the casing to prevent leakage of fluid from within the casing 14.

Provided within the opening 41 in the journal member 34 is a bearing 44, which engages the journal plug 36. A spacer gasket 46 is provided between a shoulder 47 on the journal plug 36 and the bearing 44 and journal member 34.

The actuating stem 37, which extends through opening 49 in clevis 31 and is keyed to the clevis, extends through a bearing 48 provided in support member 50 and is operatively connected to the journal member 35 by means of a key 51. Retainer 53 may be provided about the actuating stem 37 to prevent lateral movement of the stem with respect to the support member 50 and to maintain the valve plug in position in the casing.

Support member 50 is fastened to the casing 14 by means of machine screws 52. Suitable O-rings 54 and 56 are provided between the actuating stem 37 and the support member 50 and between the support member 50 and the casing 14, respectively.

As is clearly shown in FIGURE 2, a pin 60 extends through suitable openings in the clevis and is maintained in such openings by retaining rings 62. The lower part of the actuating rod 30 has a hole therein for receiving the pin 60.

The seal means 22 comprise a washer-like member detachably connected between the casing 14 and an annular support 64. The seal means may be made from a hard, horny thermoplastic material, such as polyamides like nylon; polyhalogenethylene material, such as Teflon or KEL-F; or from metal, for example, stainless steel. The leading edge of the opening 20 in the valve plug cooperates with the seal means 22 with a scissors action to cut any particles that would prevent tight valve plug seating.

The annular support 64 is affixed to the casing 14 by bolts or machine screws 66. O-ring 72 is provided to prevent leakage between the adjoining surfaces of the casing 14 and the annular support 64.

It will be noted in FIGURE 2 that the back of the valve plug lies in substantially the same plane as the apex of V-notch or inverted V-shaped opening 20. When the valve plug is wide open, the back of the valve plug 18 is in the same horizontal plane as the top or apex of opening 20. This construction eliminates any possibility of build-up of stock or slurry against the back of the valve plug.

FIGURE 3 is a perspective view of the valve plug 18 and actuating stem 37 connected to the journal member 35 thereof. It is evident that the inside and outside surface of the portion 39 of the valve plug are generally spherical. Since the valve plug 18 is essentially formed as a bowl, a minimum quantity of material is needed. By rotating the valve plug 18 about the horizontal axis passing through the journal members and the actuating stem, the flow passage through the casing 14 may be suitably controlled.

FIGURE 4 shows a plan view of the valve plug 18 and clearly illustrates in dotted line the successive shapes of the opening as the valve plug is moved from the closed position to the open position. Referring to the dotted lines from left to right, it is seen that as the valve plug 18 is rotated from the fully closed position toward the full open position, the opening first approximates an equilateral triangle. As the valve plug is rotated further, the opening remains generally triangular in configuration. In the full open position, the opening more closely approximates a circle. The configuration of the opening is extremely important in applications where the flow of fluid through the valve contains solids or where the flow is of almost semi-solid fluids. The novel shape of the opening maintains the periphery of an opening small with respect to the area of the opening and allows particles of large size to pass through the valve.

By virtue of the present construction, the leading edge 74 of the V-shaped opening in the valve plug slides on the seal with a scissors action tending to wipe the seating surface and cut any particles that would prevent tight valve plug seating. All points on the surfaces 75 and 76 of the opening follow directly behind the leading edge of the opening. This construction obviates the packing action that takes place during the actuation of other conventional valves.

It is to be noted by reference to FIGURES 1 and 5 that the V opening 20 diverges downwardly. This orientation of the opening 20 is important to permit the passage of solids through the valve even at low material flow rates. If the V-shaped opening were otherwise oriented, for example, if the V were to diverge upwardly as viewed in FIGURES 1 and 5, then the solids or particles in the fluid might accumulate or be trapped on the upstream face of the valve plug 18 and only fluid would pass through the opening.

Referring again to FIGURE 3, it is seen that the valve plug comprises essentially a hemispherical section 39 to the ends of which are secured journal members 34 and 35 respectively. The saving in material by comparison to conventional ball valves is readily apparent, for heretofore most ball valves comprised spheres through the center of which was a cylindrical opening, whereas the valve plug of the present invention comprises essentially a hemispherical section. Thus, the present flow control valve is more compact and uses a smaller quantity of material of construction than valves previously utilized in this type of service.

Another feature of the present construction is that the valve actuator need have only a short stroke, for comparatively little rotational movement is required to move the valve plug 18 from a position closing flow of fluid through the flow passage to a position permitting maximum flow through the flow passage.

The flow control valve of the present invention is particularly designed to control the flow of fluids containing solids or fluids which are almost semi-solid. The valve seals tightly and throttles the flow of the material in a highly satisfactory fashion. At the same time, the flow control valve is compact and uses a minimum quantity of expensive material of construction.

While we have shown a preferred form of our invention, it is obvious that other modifications will appear to those persons skilled in the art and we desire that the invention be limited only within the scope of the following claims.

We claim:
1. A flow control valve for use with fluids containing solids comprising, in combination, a casing having an inlet, an outlet, and a flow passage therethrough, a valve plug for selectively closing said flow passage, means mounting said valve plug in said casing for movement about a generally horizontally disposed axis, means for actuating said valve plug, and annular seal means engaging said valve plus to substantially prevent leakage between the interior of the casing and the surface of the valve plug, said valve plug having a generally spherical outer surface and having an inverted V-shaped opening therethrough extending toward the center of the valve plug from the surface thereof, thereby providing a flow path through the valve plug, such flow path being defined between the V-shaped opening in the valve plug and the seal means, with the apex of said V-shaped opening disposed at the top of said flow path, the sides of said V-shaped opening diverging downwardly so that the shape of the flow path defined between the V-shaped opening in the valve plug and the seal means will be generally triangular over a wide operating range, whereby said valve plug can be moved by said actuating means from a position closing said flow passage through said casing to a position wherein said V-shaped opening is at least partially alined with said flow passage through said casing, thus permitting flow through said valve plug.

2. A flow control valve as in claim 1, wherein both the inside surface and the outside surface of the valve plug are spherical and wherein all points on the surface of the opening defining the V follow behind the leading edge of the valve plug opening, said seal means comprising an annular ring made from a hard material, said leading edge cooperating with said seal means to cut any obstruction tending to interfere with tight valve seating.

3. A flow control valve as in claim 1, wherein the axis of rotation of the valve plug is substantially transverse to the flow path of material adapted to pass through the flow passage so that as the valve plug moves from the closed position toward the open position, the shape of the flow passage defined between the V-shaped opening in the valve plug and the seal means is substantially that of an equilateral triangle and as the valve plug approaches the full open position, the shape of the flow passage defined between the V-shaped opening in the valve plug and the seal means approximates a circle.

4. A flow control valve for fluids containing solids comprising in combination, a casing having a flow passage therethrough, a valve plug rotatably mounted in said flow passage for selectively closing the flow passage, and seal means comprising an annular ring engaging said valve plug to substantially prevent leakage between the valve plug and the walls of the casing defining the flow passage, said valve plug having an inverted V-shaped opening therethrough having sides extending from the outer surface of the valve plug and converging toward the center thereof, the flow path through the valve plug being between the walls of the casing defining the flow passage and the surface of the valve plug defining the opening therethrough, the flow path through the valve plug being generally triangular as the valve plug is throttled into the closed position from the open position, with the apex of said V-shaped opening disposed at the top of said flow path, whereby separation of the solids from the transporting fluid is minimized.

5. A flow control valve for fluids containing solids comprising in combination, a casing having a flow passage therethrough, a spherical valve plug mounted in said flow passage for selectively closing same and being movable about a horizontal axis, and an annular seal engaging said valve plug and the walls of the casing defining the flow passage, said valve plug having an inverted V-shaped opening therethrough, the sides of said opening extending from the outer surface of the valve plug and converging to an apex towards the center thereof, the flow path through the valve plug being between the walls of the casing defining the flow passage and the surface of the valve plug defining the opening therethrough, the flow path through the valve plug being generally triangular as the valve plug is throttled into the closed position from the open position, whereby separation of the solids from the transporting fluid is minimized, the apex of the opening lying in the same horizontal plane as the back of the valve plug when the valve plug is wide open, thereby eliminating build-up of solids against the back of the valve plug.

References Cited by the Examiner

UNITED STATES PATENTS

| 806,079 | 11/05 | Gavelek | 251—209 XR |
| 1,076,802 | 10/13 | White | 251—301 |
| 1,105,209 | 7/14 | Sauchereau | 251—301 |
| 1,850,850 | 3/32 | Peterson | 251—205 |
| 2,851,051 | 9/58 | Englert et al. | 137—242 |
| 2,883,147 | 4/59 | Mirza et al. | 251—172 |

FOREIGN PATENTS 831,862  6/38  France.

ISADOR WEIL, *Primary Examiner.*